3,352,930
PROCESS FOR HYDRATING PROPYLENE
Maurice Louis Mention, deceased, late of Melle, Deux-Sevres, France, by Jeanne Pauline Deminier, Melle, Deux-Sevres, France, heir, legal guardian of minor heirs, and administratrix of Madeleine Germaine Mention, Jean-Paul Henri Mention, Melle, Deux-Sevres, and Yvonne Louise Verdier, nee Mention, Bagneux, France, heirs, and Georges Gobron, Melle, Deux-Sevres, France, assignors to Les Usines de Melle, Deux-Sevres, France, a company of France
No Drawing. Filed Jan. 24, 1964, Ser. No. 340,104
Claims priority, application France, Feb. 7, 1963, 924,047
4 Claims. (Cl. 260—641)

This invention relates to the production of isopropanol.

The principal object in the invention is to provide a simple, efficient process for the production of isopropanol.

The production of isopropanol by passing a mixture of gaseous propylene and water vapor through a hydration bath comprising mainly sulfuric acid and water while maintaining the bath at a suitable temperature is known. The isopropanol is entrained in excess gas as it is formed.

In such process, the main reactions which occur simultaneously with the vaporization of water and vaporization of the isopropanol which is produced are as follows:

Reaction of propylene with sulfuric acid $$H_2SO_4 + C_3H_6 \rightarrow C_3H_7HSO_4 \quad (1)$$

Hydrolysis of the isopropyl hydrogen sulfate formed $$C_3H_7HSO_4 + H_2O \rightarrow H_2SO_4 + C_3H_7OH \quad (2)$$

In addition a number of side reactions or physical changes occur which tend to decrease the yield of the desired product. These are:

Formation of di-isopropyl oxide $$2C_3H_7HSO_4 + H_2O \rightarrow 2H_2SO_4 + (C_3H_7)_2O$$

Vaporization of di-isopropyl oxide
Reduction of $H_2SO_4$ to $SO_2$
Polymerization of propylene.

Each of these reactions or physical changes is influenced by the reaction conditions. These are primarily temperature, pressure, presence or absence of catalysts and sulfuric acid concentration expressed as $H_2SO_4/H_2SO_4+H_2O$.

Thus, an increase of the sulfuric acid concentration exerts a favorable effect upon Reaction 1, by increasing the speed thereof. On the other hand, Reaction 2 is unfavorably affected.

On the other hand, a decrease of the sulfuric acid concentration is favorable to Reaction 2 but detrimental to Reaction 1, and also results in the removal, by distillation, of a greater amount of water in addition to isopropanol and di-isopropyl oxide. This increases the heat requirements of the process.

An increase in the temperature also results in polymer formation, especially where the sulfuric acid concentration is high, and also $SO_2$ formation. On the other hand, a large decrease in the temperature also decreases the reaction velocity. Moreover, the lowered vapor pressure of the isopropanol leads to obtaining at the exit from the bath, gases which are poor in isopropanol. This increases the cost of recovering this product.

These influences of the reaction factors are given as examples to show that the choice of operating conditions for such a process is finally a compromise between sometimes conflicting influences and that no one of the factors should be regarded as characteristic or critical independent of the other factors.

This invention accordingly comprises the novel processes and steps of processes, specific embodiments of which are described hereinafter by way of example and in accordance with which we now prefer to practice the invention.

In British Patent No. 798,260 it has been shown that working at atmospheric pressure and without catalysts, economical operating conditions are obtained for a sulfuric acid concentration, as defined, of 75% by weight, a reaction temperature of 75° C. and a propylene throughput, through the bath, of 2000 cubic meters per hour per cubic meter of bath.

Under such conditions the gases leaving the bath contain, per cubic meter, about 40 grams of isopropanol, 1 gram of water and 2 grams of di-isopropyl oxide. The isopropanol can be recovered from the gases by water washing, the water-insoluble di-isopropyl oxide remaining in the gases.

Thus, in the process of the British patent, the isopropanol can be finally recovered by distilling the aqueous solution thereof, while the excess propylene, containing the di-isopropyl oxide, is returned to the bath. Owing to such return, the only product finally produced is isopropanol. Of course, the bath should be fed with sufficient water to compensate for the water used in the formation of isopropanol and the water vaporized together with the isopropanol by the excess propylene stream.

It has now been found in accordance with this invention that it is possible to obtain a higher isopropanol concentration in the gases leaving the bath and to recover more isopropanol without increasing the water proportion therein.

These advantageous results are obtained without any detrimental consequence while maintaining the temperature and sulfuric acid concentration conditions already known to be the most favorable at atmospheric pressure, by increasing the operating pressure to from about 1.5 to about 6 kg./cm.², absolute pressure in the whole of the apparatus, including the washing column.

It is found that at the low pressures mentioned the isopropanol content in the gases is substantially proportional to the pressure. However, where the pressure exceeds 5–6 kg./cm.², absolute pressure, the isopropanol content in the gases increases much more slowly than the pressure.

Accordingly, the process of this invention comprises hydrating propylene by passing a propylene stream, at a pressure between about 1.5 and about 6 kg./cm.², absolute pressure, through a bath containing sulfuric acid and water in the relative proportion of from about 70% to about 80% as above defined while maintaining the bath at a temperature of from about 70° C. to about 80° C.

The use of catalysts is within the scope of this invention, although not essential thereto. Suitable catalysts include silver or copper salts such as carbonates, sulfates, acetates or hydroxides.

An important advantage of the process is that the water washing of the gas-vapor mixture results in a more concentrated isopropanol aqueous solution, the distillation of which is more economical. Moreover, the relative amount of water vaporized from the bath is lowered with the result that the amount of heat to be furnished to the bath, with respect to the isopropanol produced, is also lowered.

The result is unobvious, since the application of the laws of vaporization of a liquid mixture would lead to the prediction that an increase in pressure could not alter the isopropanol content of the gaseous mixture leaving the bath. This result is probably due to the fact that the bath, at equilibrium, contains a higher proportion of free isopropanol.

A further advantage of operating at a superatmospheric pressure, as compared with working at atmospheric pressure, is that the output per unit of time per unit of volume of bath is increased in the same proportion as the isopropanol content in the gases. It follows therefrom that the apparatus, though it should be made of thicker material to withstand pressure, is nevertheless cheaper owing to its being smaller. This is also true of the washing column used to recover the isopropanol from the circulating gases.

Furthermore, it has been found that polymer formation, although already low in the conventional process at atmospheric pressure, is still further diminished by working above atmospheric pressure. Also reduction of the conversion of $H_2SO_4$ to $SO_2$ is diminished at the superatmospheric pressure used.

The following examples illustrate the manner in which we now prefer to practice this process. It is to be understood that this invention is not to be considered as limited thereto except as indicated in the appended claims.

*Example 1*

Into a lead-lined vessel, there is introduced 750 kg. of pure sulfuric acid, 1.84 specific gravity and 250 kg. of water.

The vessel is provided with suitable dispersing means so that propylene circulated by a blower can be intimately dispersed throughout the liquid. It is also provided with means to heat or cool the liquid so as to keep it at a substantially constant temperature.

Propylene at a pressure of 3 kg./cm.$^2$, absolute pressure, is passed through the liquid mixture at a rate of 2180 cubic meters per hour, at said pressure, the temperature in the vessel is maintained at 80° C. and water is continuously fed at such a rate that the sulfuric acid concentration expressed by the ratio $$\frac{H_2SO_4}{H_2SO_4+H_2O}$$

remained approximately constant at about 75%.

The liquid bath becomes progressively richer in isopropanol (part of said isopropanol being free and the remainder in the form of isopropyl hydrogen sulfate) and the gases leaving the bath also contain more and more isopropanol, until an equilibrium is reached.

At equilibrium, the bath contains 33.7% of free or combined isopropanol and the sulfuric acid concentration, as above defined, is 75.9%. The gases leaving the bath contain 103 grams of isopropanol per cubic meter. They are sent, without release of pressure, to a column in which they are washed with water to retain the isopropanol. The propylene leaving the washing column is returned to the bath by a blower after admixing with an amount of fresh propylene corresponding to the isopropanol produced, i.e., 160 kg. per hour of propylene.

The output amounts to 225 kg. of isopropanol per hour. The isopropanol is recovered as an 8% aqueous solution from the foot of the washing column. The steam requirement to convert the 225 kg. of isopropanol to isopropanol-water azeotropic mixture containing 87% of isopropanol amounts to 450 kg. of steam, i.e., 1.75 kg. per kg. of azeotropic mixture.

*Example 2*

Into the same vessel as in Example 1, initially charged with 750 kg. of sulfuric acid, 1.84 specific gravity and 250 kg. of water, there was introduced per hour 2200 cubic meters of propylene at a pressure of 2 kg./cm.$^2$, absolute pressure.

At equilibrium, at 80° C., the bath contained 30% of free or combined isopropanol and the sulfuric acid concentration (as above defined) therein is 74.2%. The gases leaving the vessel contain 75 grams of isopropanol per cubic meter.

The output amounts to 165 kg. of isopropanol per hour. The isopropanol is recovered as a 6% aqueous solution from the foot of the washing column. The steam requirement to convert the isopropanol to its aqueous azeotrope amounts to 440 kg. of steam, i.e., 2.3 kg. per kg. of azeotrope.

For sake of comparison, in the same vessel, containing initially 750 kg. of $H_2SO_4$, 1.84 specific gravity and 250 kg. of water, there is introduced 2440 cubic meters per hour of propylene under atmospheric pressure (i.e., 1 kg./cm.$^2$ absolute pressure). At a temperature of 78° C. the bath reaches an equilibrium with a sulfuric acid concentration, as above defined, of 75% and a free or combined isopropanol content of 21%. The gases leaving the bath contain 40 grams of isopropanol per cubic meter.

The output amounts to 97.5 kg. of isopropanol per hour. The isopropanol is recovered as a 3.5% aqueous solution from the foot of the washing column. The steam expense required to convert the isopropanol to its aqueous azeotrope is 310 kg. of steam, i.e., 2.8 kg. per kg. of azeotrope.

*Example 3*

The process of Example 1 is repeated, but the pressure was 6 kg./cm.$^2$, absolute pressure.

The same reaction vessel and the same starting bath as in Example 1 are employed.

Propylene at a pressure of 6 kg./cm.$^2$, absolute pressure is passed through the liquid mixture at a rate of 2180 cubic meters per hour, at said pressure, the temperature in the vessel is maintained at 80° C. and water is continuously fed at such a rate that the sulfuric acid concentration, as above defined, remains approximately constant at about 80%.

At equilibrium, the bath contains 39% of free or combined isopropanol and the sulfuric acid concentration, as above defined, is 79%. The gases leaving the bath contain 160 grams of isopropanol per cubic meter. They are washed as described in Example 1. The propylene leaving the washing column is returned to the bath by the blower, after admixing with an amount of fresh propylene corresponding to the isopropanol produced, i.e., 248 kg. per hour of propylene.

The output amounts to 346 kg. of isopropanol per hour. The isopropanol is recovered as a 9% aqueous solution from the foot of the washing column. The steam requirement to convert the 346 kg. of isopropanol to isopropanol-water azeotropic mixture amounts to 400 kg. of steam, i.e., 1.16 kg. per kg. of azeotropic mixture.

The following table, which summarizes the results from the above examples, clearly shows the advantages of the process of the invention:

| Absolute pressure (kg.) | Free or combined isopropanol content of the bath (percent) | Isopropanol content of the gases leaving the bath (g./m.$^3$) | Concentration of the alcoholic solution recovered (percent) | Steam expense per kg. of azeotrope produced (kg.) | Hourly Production (kg.) |
|---|---|---|---|---|---|
| 1 | 21 | 40 | 3.5 | 2.8 | 97.5 |
| 2 | 30 | 75 | 6 | 2.3 | 165 |
| 3 | 33.7 | 103 | 8 | 1.75 | 225 |
| 6 | 39 | 160 | 9 | 1.16 | 346 |

*Example 4*

The same vessel as in Example 1 is initially charged with 637.5 kg. of sulfuric acid, 1.84 specific gravity, 212.5 kg. of water and 10.5 kg. of silver carbonate as a catalyst.

Into the liquid mixture there is introduced per hour 2200 cubic meters of propylene at a pressure of 2 kg./cm.$^2$, absolute pressure.

At equilibrium, at 73° C., the bath contains 30% of free or combined isopropanol and the sulfuric acid concentration (as above defined) therein is 70%. The gases leaving the vessel contain 75 grams of isopropanol per cubic meter.

The output amounts to 165 kg. of isopropanol per hour. The isopropanol is recovered as a 6% aqueous solution from the foot of the washing column. The steam requirement to convert the isopropanol to its aqueous azeotrope amounts to 440 kg. of steam, i.e., 2.3 kg. per kg. of azeotrope.

As compared with Example 2, it is thus seen that the use of a catalyst allows exactly the same production to be obtained by starting from a smaller volume of bath and operating, at equilibrium, with a lower sulfuric acid concentration (as above defined).

What is claimed is:

1. A continuous process for the production of isopropanol which consists of passing a stream of propylene through a liquid hydration bath containing sulfuric acid, water and isopropanol, at an absolute pressure of from 1.5 kg./cm.$^2$ to 6 kg./cm.$^2$, at a temperature of from 70° C. to 80° C., the weight ratio of sulfuric acid to the total sulfuric acid plus water in said hydration bath being from 70% to 80%, recovering the gases leaving said hydration bath and washing said gases with water to substantially separate the isopropanol from unreacted propylene in said gases, said recovering and washing being effected at the aforesaid pressure, while continuously adding water to said hydration bath to maintain the weight ratio of the sulfuric acid at from 70% to 80%, as aforesaid.

2. The process of claim 1 in which the hydration bath contains a catalyst selected from the group consisting of copper and silver carbonates, sulfates, acetates and hydroxides.

3. A continuous process for the production of isopropanol which consists of passing a stream of propylene through a liquid hydration bath containing sulfuric acid, water and isopropanol, at an absolute pressure of from 1.5 kg./cm.$^2$ to 6 kg./cm.$^2$, at a temperature of from 70° C. to 80° C., the weight ratio of sulfuric acid to the total sulfuric acid plus water in said hydration bath being from 70% to 80%, recovering the gases leaving said hydration bath and washing said gases with water to substantially separate the isopropanol from unreacted propylene in said gases, said recovering and washing being effected at the aforesaid pressure, while continuously adding water to said hydration bath to maintain the weight ratio of the sulfuric acid at from 70% to 80%, as aforesaid, and returning said unreacted propylene together with additional propylene to the liquid hydration bath.

4. The process of claim 3 in which the hydration bath contains a catalyst selected from the group consisting of copper and silver carbonates, sulfates, acetates and hydroxides.

References Cited
UNITED STATES PATENTS

| | | | |
|---|---|---|---|
| 2,092,164 | 9/1937 | Joshua et al. | 260—641 |
| 2,093,426 | 9/1937 | Dreyfus | 260—641 |
| 2,109,004 | 2/1938 | Archibald et al. | 260—641 |

FOREIGN PATENTS 364,221  10/1930  Great Britain.

LEON ZITVER, *Primary Examiner.*

J. E. EVANS, *Assistant Examiner.*